Jan. 19, 1937.  H. H. TIMIAN  2,068,117
ENGINE
Filed Feb. 27, 1933
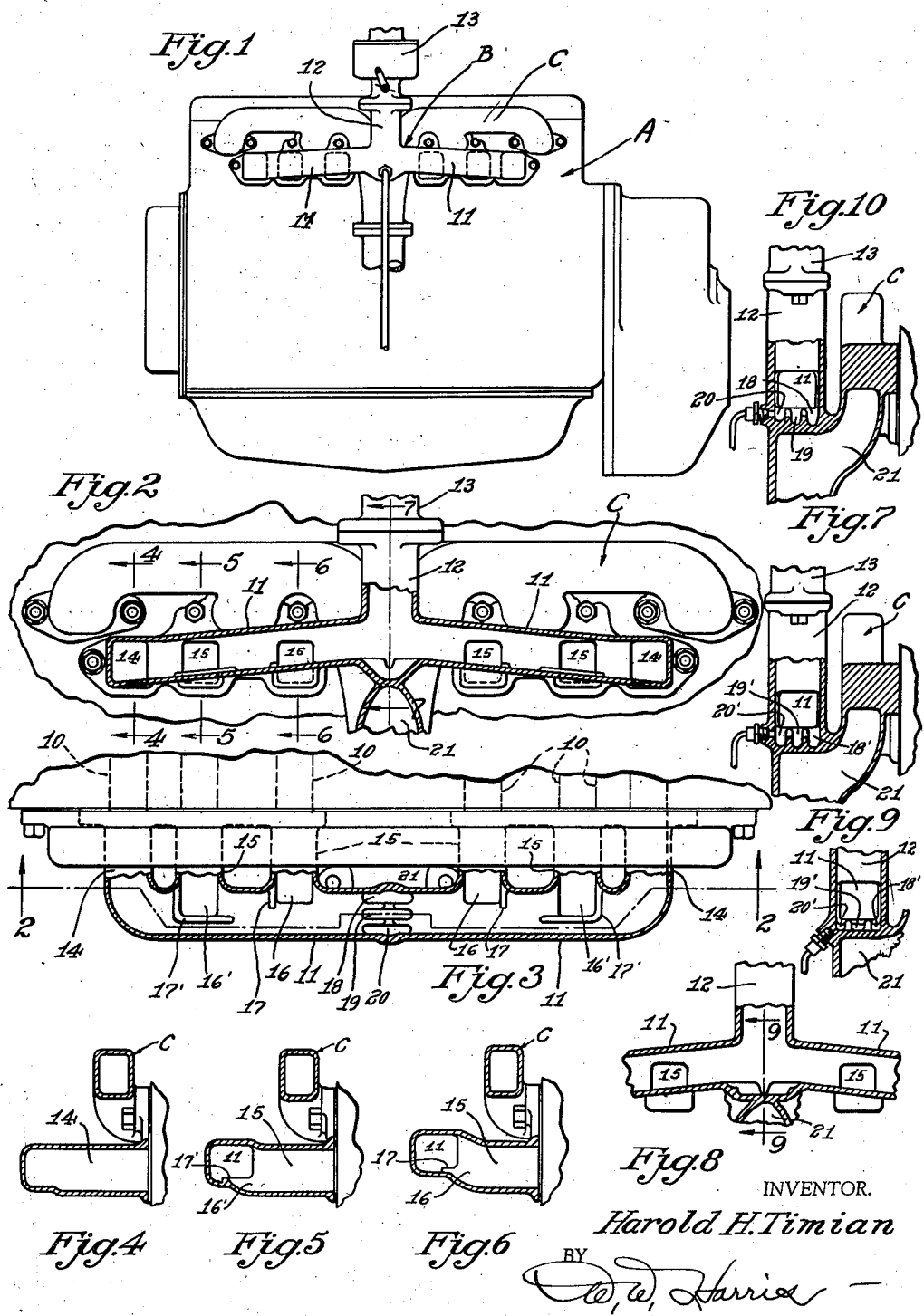
INVENTOR.
Harold H. Timian
BY
[signature]
ATTORNEY.

Patented Jan. 19, 1937

2,068,117

UNITED STATES PATENT OFFICE 2,068,117

ENGINE

Harold H. Timian, Detroit, Mich., assignor to Continental Motors Corporation, Detroit, Mich., a corporation of Virginia Application February 27, 1933, Serial No. 658,691

11 Claims. (Cl. 123—52)

My invention relates to engines and more particularly to means for distributing combustible fluid to a multi-cylinder engine, the present invention having to do more particularly with an intake manifold structure which is constructed to uniformly distribute the wet fuel precipitate to the engine cylinders. It will be noted that the embodiment of my invention herein illustrated provides a primary fuel mixture conducting portion extending generally downwardly from the carburetor to the fuel distributing chamber, this type of manifold being generally referred to as a down draft manifold, though it will be noted that the principles of my invention may be incorporated in manifold structures other than those of the down draft type.

An object of my present invention provides an engine of the multi-cylinder type having generally improved operating characteristics by providing therefore an intake manifold structure particularly constructed for controlling wet fuel distribution whereby to distribute substantially uniform quantities of the wet fuel to the engine cylinders during relatively low load engine operation and during engine acceleration.

Another object of my present invention is to provide an improved manifold structure including means acting on the wet fuel flow for successively removing predetermined quantities of the wet fuel from the manifold conducting portion for uniform distribution to the engine cylinders.

A further object of my invention is to provide an intake manifold structure for a multi-cylinder engine and having a plurality of port runners connecting the engine with a common lateral runner, said manifold being constructed to successively remove substantially equal amounts of the wet fuel from the lateral runner whereby to uniformly distribute said wet fuel to the engine cylinders through said port runners.

A still further object of my present invention is to provide an engine having generally improved operating characteristics during engine starting and during engine acceleration by providing an intake manifold having means constructed and arranged to cooperate with the wet fuel distributing means located in the lateral runner portion of the intake manifold, said means being arranged to compensate for the unequal quantities of fuel lying in the lateral runner for conduction into said several cylinders, whereby to provide a substantial uniform wet fuel distribution to the cylinders of the engine.

For a more detailed understanding of my invention, reference may be had to the accompanying drawing which illustrates one form which my invention may assume, and in which:

Fig. 1 is a side elevational view of an engine equipped with an intake manifold structure constructed in accordance with my invention, Fig. 2 is an enlarged elevational view of the intake manifold structure, partly in section showing in more detail the means by which the distribution of the wet fuel is obtained, this figure being taken substantially on the line 2—2 of Fig. 3, Fig. 3 is a plan view of the intake manifold structure, partly in section and showing the wet fuel distributing means associated therewith.

Fig. 4 is a detail sectional view taken substantially on the line 4—4 of Fig. 2, Fig. 5 is a detail sectional view taken substantially on the line 5—5 of Fig. 2, Fig. 6 is a sectional view taken on the line 6—6 of Fig. 2, Fig. 7 is a sectional view taken substantially on the line 7—7 of Fig. 2, Fig. 8 is a fragmentary sectional view of the intake manifold showing a modified construction, Fig. 9 is a section on the line 9—9 of Fig. 8, and Fig. 10 is a sectional view of a further modified construction.

In the accompanying drawing I have shown my improved manifold structure in connection with a multi-cylinder engine A having a plurality of inlet ports 10, these ports being preferably arranged for association with individual engine cylinders (not shown).

The intake manifold structure B includes a pair of oppositely extending lateral runners 11 and a primary fuel mixture conducting portion 12 extending generally upwardly from the lateral runners, said conducting portion 12 being adapted for connection with the usual carburetor structure 13. This type of manifold is generally referred to as a down draft manifold, and it will be obvious that the principles of my invention are not limited to use with a down draft manifold, since in its broadest aspects the principles of my invention may be adapted for use with a manifold structure other than that of the down draft type. In Figs. 2 and 3 I have particularly illustrated in more detail the principles of my intake manifold structure. It will be noted that the lateral runners 11 slope generally downwardly from the primary fuel mixture conducting portion 12 and each terminates in a port runner 14, these port runners 14 being adapted for connecting the manifold with the end cylinders of the engine. I have provided intermediate port runners 15 which are adapted for connecting the lateral runners with the intermediate engine cylinders. It will be noted that the lateral runners 11 extend generally longitudinally of the engine and the port runners are spaced from each other longitudinally of the lateral runners.

In the operation of the engine the fuel mixture is introduced into the intake manifold through the primary fuel mixture conducting portion 12, the fuel mixture being divided and conducted through the lateral runners 11 and thence through the port runners into the engine. During engine operation, wet fuel is precipitated from the fuel mixture flowing through the manifold, this wet fuel being precipitated on the floor of the manifold and caused to move along the floor by the force exerted by the moving fuel mixture stream. At relatively low load engine operation, or at low speed operation, the amount of wet fuel precipitated from the fuel mixture is greater than at relatively higher speeds or high load engine operation, and the efficient operation of the engine is dependent largely on the manner in which the wet fuel distribution is controlled, the uniform distribution of the wet fuel improving engine performance particularly on starting and for relatively low load engine operation. The lateral runners are sloped as shown in the drawing in order to relatively increase the velocity of the wet fuel as the same flows down the lateral runner, the time element involved in the flowing of the wet fuel longitudinally of the lateral runner having an important bearing on the accuracy in which the wet fuel may be distributed to the several cylinders of the multi-cylinder engine.

The intermediate port runners 15 are arranged to communicate with the lateral runners 11 by means of the openings 16 and 16'. In the particular embodiment of my invention shown in the accompanying drawing, I have provided two intermediate runners 15 and an end runner 14 for each lateral runner 11, this particular manifold structure being adapted for association with a 6 cylinder engine. It will be observed however that the principles of my invention may be incorporated with a four or eight cylinder engine if so desired. Referring particularly to Figures 2 to 6 inclusive showing a manifold structure for a 6 cylinder engine, it will be noted that the openings connecting the lateral runner with the port runners are arranged to be positioned partly in the side wall of the lateral runner and partly in the bottom wall thereof. It will be noted that the opening 16' contained in the bottom wall of the runner is of greater extent than the opening 16, and in the particular illustration, the opening 16 is extended approximately one-third of the way across the floor of the lateral runner while opening 16' extends substantially two-thirds across the floor of the runner. These openings are spaced longitudinally of the lateral runner and are arranged to successively intercept the wet fuel flowing along the floor of the runner, the opening 16, which is the closest to the junction of the lateral runner and the primary fuel mixture conducting portion is spaced therefrom a distance sufficient to permit the wet fuel introduced therein to attain equilibrium prior to being acted upon by the opening 16 which removes approximately one-third of the wet fuel from the wet fuel stream. The second opening 16' removes another third of the wet fuel from the stream and the remaining third is permitted to flow into the end port runner 14. These openings are so constructed as to remove the wet fuel downwardly from the floor of the lateral runner and to thus drain the wet fuel into the associated port runners for conduction into the engine.

In order to further control the wet fuel distribution I have provided a dam 17 associated with the opening 16 and a dam 17' associated with the opening 16'. These dams are associated or located to one side of the opening 16 remote from the junction of the primary fuel mixture conducting portion and the said lateral runners. These dams may be of various designs and shapes and in the present illustration I have shown the dam 17 as merely extending transversely of the lateral runner, while the dam 17' also extends longitudinally of the runner adjacent one edge of the opening as well as transversely adjacent the far edge of the opening. The particular design and shape of the dams may be best determined by experiment and I wish it understood that I do not limit myself to any particular design or shape of dam, and neither do I limit my invention in its broader aspects to any particular embodiment thereof or to any particular location of same.

The wet fuel contained within the manifold tends to puddle in the lower portion of the manifold structure, and on starting the engine these puddles are swept into the engine cylinder. These puddles are mainly collected on the floor of the port runners, but in addition there is a wet fuel film which collects on the floor of the lateral runners. During engine acceleration and particularly on starting the engine, this wet fuel is swept into the engine cylinders prior to the obtaining of the necessary fuel mixture distribution during ordinary engine operation. It will be noted that the portion of the lateral runner containing wet fuel precipitate adapted to be swept into the end port runner 14 is of greater extent than that portion of a lateral runner containing wet fuel precipitates adapted to be swept into the intermediate port runners 15, and in order to compensate for the tendency of the cylinders receiving different quantities of wet fuel on engine acceleration or on engine starting, some means must be provided for supplementing the wet fuel supply to those port runners which do not receive as much wet fuel as the end port runner 14. This is accomplished in my present invention by providing a well structure adjacent the intersection of the lateral runners and the primary fuel mixture conducting portion. This well structure provides a plurality of recesses 18, 19 and 20 respectively arranged to cooperate with the opening 16, the opening 16', and the end port runner 14. These recesses are preferably arranged to have different capacities, though this may not be necessary in all instances. In Fig. 10 I have shown the recess 18 deeper than the recesses 19 and 20, these recesses 18, 19 and 20 being progressively reduced in depth. On stopping the engine it will be noted that the wet fuel is collected in these recesses and when the engine is started the wet fuel in these recesses is swept into the lateral runner and conducted toward the openings 16, 16' and the end port runner 14. Due to the fact that the first opening 16 receives a lesser amount of wet fuel from the lateral runner than the opening 16' and the end port runner 14 the recess 18 is expected to have a greater capacity so as to provide a greater amount of wet fuel to compensate for the aforesaid differences. As a result of the above described construction, a uniform distribution of the wet fuel may be had.

It will be noted that the exhaust manifold portion C is provided with an exhaust conducting portion 21 associated with the central portion of the intake manifold (see Figs. 9 and 10). The exhaust portion is constructed or located in heat transference relation with a portion of the well structure whereby to provide heat for vaporizing any wet fuel that tends to collect therein during engine operation. When starting the engine it will be noted that very little heat is transmitted from the exhaust gas conducting portion 21 into the well structure of the intake manifold, but after the engine is in operation for a short time this heat is sufficient to maintain the fuel precipitates in the well structure at a minimum, and preferably maintains the level of the wet fuel in the well at a level lower than that attained by the wet fuel collected therein when the engine is cold. The above construction thus acts to vaporize any surplus wet fuel that may collect in the well and thus acts to provide a richer fuel mixture for conduction to the engine cylinders prior to the time the engine gets thoroughly warmed up.

In Fig. 7 the recesses in the well structure are constructed of substantially the same capacity and likewise the recesses 18', 19' and 20' illustrated in Fig. 9 are also constructed to have substantially the same capacity. However, the well structure shown in Figs. 8 and 9 is constructed so as to not provide an excessive collecting basin for the wet fuel as in some instances it may be desirable to maintain the wet fuel accumulations at this point at a minimum.

It will be noted that the intake manifold structure as described above also provides means for very accurately distributing the wet fuel to the several cylinders of the engine. Furthermore, the construction as herein described is particularly adapted for controlling wet fuel distribution primarily for engine starting and for engine acceleration. It has been found that improved engine performance, fuel economy, and general all around engine efficiency is dependent to a large extent on the accurate distribution of the wet fuel, especially at low load engine operation.

It will be apparent to those skilled in the art to which my invention pertains that various modifications and changes may be made therein without departing from the spirit of my invention or from the scope of the appended claims.

What I claim as my invention is:

1. An intake manifold structure constructed for detachable assembly with a multi-cylinder engine and including a primary fuel mixture conducting portion, a lateral runner communicating therewith, said lateral runner sloping generally downwardly and terminating in a port runner communicating with an end cylinder of the engine and having a floor extending substantially flush with the adjacent floor of the lateral runner, said lateral runner having one or more intermediate openings, and one or more intermediate port runners extending toward the engine from said lateral runner and communicating with said opening or openings, said intermediate port runner or runners having a floor extending substantially horizontal and at a level substantially below the adjacent floor of the lateral runner.

2. An intake manifold structure for a multi-cylinder engine including a primary fuel mixture conducting portion, a lateral runner communicating therewith, said lateral runner sloping generally downwardly and terminating in a port runner communicating with an end cylinder of the engine and having a floor extending substantially flush with the adjacent floor of the lateral runner, said lateral runner having one or more intermediate openings, and one or more intermediate port runners communicating with said opening or openings, said intermediate port runner or runners having a floor extending at a level substantially below the adjacent floor of the lateral runner, said intermediate opening or openings lying partly in the floor of said lateral runner and in a side wall thereof.

3. An intake manifold structure for a multi-cylinder engine including a primary fuel mixture conducting portion, a lateral runner communicating therewith and provided with a plurality of openings spaced longitudinally thereof, and port runners communicating with said openings, the intermediate openings having portions of varying extent intersecting the floor of the lateral runner, whereby to control the distribution of the wet fuel flow.

4. An intake manifold structure for a multi-cylinder engine including a primary fuel mixture conducting portion, a lateral runner communicating therewith and provided with a plurality of openings spaced longitudinally thereof, and port runners communicating with said openings, the intermediate openings having portions of varying extent intersecting the floor of the lateral runner, whereby to control the distribution of the wet fuel flow, the intermediate opening more remote from the intersection of said lateral runner with the primary fuel mixture conducting portion intersecting the floor of the lateral runner to a greater extent than the intermediate opening less remote.

5. An intake manifold for a multi-cylinder engine including a primary fuel mixture conducting portion, a lateral runner communicating therewith and extending longitudinally of the engine, and spaced port runners connecting said lateral runner with the engine, the intermediate port runners connected with said lateral runner by openings having portions of varying extent contained in the floor of the lateral runner whereby to control the distribution of the wet fuel flow.

6. An intake manifold for a multi-cylinder engine including a primary fuel mixture conducting portion, a lateral runner communicating therewith and extending longitudinally of the engine, and spaced port runners connecting said lateral runner with the engine, the intermediate port runners connected with said lateral runner by openings having portions of varying extent contained in the floor of the lateral runner whereby to control the distribution of the wet fuel flow, said openings acting to successively remove predetermined quantities of the wet fuel stream flowing through the lateral runner.

7. An intake manifold for a multi-cylinder engine including a primary fuel mixture conducting portion, a lateral runner communicating therewith and extending longitudinally of the engine, and spaced port runners connecting said lateral runner with the engine, the intermediate port runners connected with said lateral runner by openings having portions of varying extent contained in the floor of the lateral runner whereby to control the distribution of the wet fuel flow, and dams associated with said openings and acting to further control the distribution of said wet fuel flow.

8. An intake manifold for a multi-cylinder engine including a primary fuel mixture conducting portion, a lateral runner communicating therewith and extending longitudinally of the engine, and spaced port runners connecting said lateral runner with the engine, the intermediate port runners connected with said lateral runner by openings having portions of varying extent contained in the floor of the lateral runner whereby to control the distribution of the wet fuel flow, and dams located to that side of the opening most remote from the intersection of said lateral runner and said primary conducting portion and cooperating with said openings to further control the distribution of wet fuel flow.

9. An intake manifold for a multi-cylinder engine including a primary fuel mixture conducting portion, a lateral runner communicating therewith and extending longitudinally of the engine, and spaced port runners connecting said lateral runner with the engine, the intermediate port runners connected with said lateral runner by openings having portions of varying extent contained in the floor of the lateral runner whereby to control the distribution of the wet fuel flow, and dams adjacent to said openings for controlling wet fuel distribution, at least one of said dams having an extension extending longitudinally of the lateral runner adjacent the edge of the opening.

10. An intake manifold for a multi-cylinder engine including a primary fuel mixture conducting portion, a lateral runner communicating therewith and extending longitudinally of the engine, said lateral runner sloping generally downwardly away from said primary conducting portion to relatively accelerate the wet fuel flow along the floor of said lateral runner, means for controlling distribution of the wet fuel to the engine cylinders and including a plurality of openings spaced longitudinally in the floor of the lateral runner, said openings being of varying extent whereby to successively remove predetermined quantities of the wet fuel downwardly from the floor of the lateral runner, and port runners connecting said openings with the engine.

11. An intake manifold for a multi-cylinder engine including a primary fuel mixture conducting portion, a lateral runner communicating therewith, a well structure at the junction of said lateral runner with said primary conducting portion, means spaced longitudinally of the lateral runner for removing substantially equal amounts of wet fuel from the lateral runner for distribution to the engine cylinders, said well structure including recesses of different capacity, each recess cooperating with one of said means, the recess of relatively greater capacity being associated with said means located closer thereto and providing a greater amount of wet fuel to be swept into said relatively closer means from said well structure during engine acceleration to compensate for the lesser amount of wet fuel precipitate on the floor of the runner intermediate the said means and well structure, whereby to obtain substantially uniform wet fuel distribution to the engine cylinders during engine acceleration.

HAROLD H. TIMIAN.